(12) United States Patent
Lucier et al.

(10) Patent No.: US 8,881,120 B2
(45) Date of Patent: Nov. 4, 2014

(54) SYSTEMS AND METHODS FOR CREATING MULTI-STATE CONTENT

(75) Inventors: Corey Lucier, Berryville, VA (US); Eliot Seth Greenfield, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1351 days.

(21) Appl. No.: 12/193,833

(22) Filed: Aug. 19, 2008

(65) Prior Publication Data

US 2014/0250421 A1    Sep. 4, 2014

Related U.S. Application Data

(60) Provisional application No. 61/049,874, filed on May 2, 2008.

(51) Int. Cl.
*G06F 9/45* (2006.01)

(52) U.S. Cl.
USPC .......................................... 717/140; 717/141

(58) Field of Classification Search
None
See application file for complete search history.

(56) References Cited

U.S. PATENT DOCUMENTS

2007/0006078 A1*   1/2007   Jewsbury et al. ............. 715/716

OTHER PUBLICATIONS

"Chapter 32. States," web page at http://www.openlaszlo.org/lps4.1/docs/developers/states.html available via the Internet and printed on Jul. 15, 2008.
"Adobe—Flex Quick Start Basics: Creating States," web page at http://www.adobe.com/devnet/flex/quickstart/defining_$L_{state}$_transitions/ available via the Internet and printed on Jul. 15, 2008.
U.S. Appl. No. 11/194,118, None available, Kuwamoto, et al.

* cited by examiner

*Primary Examiner* — Qamrun Nahar
(74) *Attorney, Agent, or Firm* — Kilpatrick Townsend & Stockton LLP

(57) ABSTRACT

Methods and systems for creating multi-state content using state information are disclosed. The state information may specify, for example, that a subcomponent is included in one state and excluded from another state. As another example, the state information may specify that an attribute of the object will have a first value in one state and a different value in another state. Certain embodiments allow a developer to use declarative statements to specify different states for an object. These declarative statements may directly specify the appearance attributes or subcomponents of the object. Certain embodiments allow a developer to specify state-specific appearance attributes and sub-components within the general specification of the object and without having to specify appearance attributes or subcomponents in terms of changes to a base state or any other state.

30 Claims, 13 Drawing Sheets

```xml
<?xml version="1.0"?>
<mx:Application xmlns:mx="http://www.adobe.com/2006/mxml"
      verticalAlign="middle">

<!-- The Application class states property defines the view states. -->
      <mx:states>
          <mx:state name="Login"/>
          <mx:state name="Register"/>
      </mx:states>

<mx:Panel title="Login" title.Register="Register" id="loginPanel"
          horizontalScrollPolicy="off" verticalScrollPolicy="off">
          <mx:Form id="loginForm">
              <mx:FormItem label="Username:">
                  <mx:FormInput/>
              </mx:FormItem>
              <mx:FormItem label="Password:">
                  <mx:TextInput/>
              </mx:FormItem>
              <mx:FormItem id="confirm" label="Confirm:" includeIn="Register">
                  <mx:TextInput/>
              </mx:FormItem>
          </mx:Form>
```

```
<mx:Application xmlns:mx="http://www.adobe.com/2006/mxml"
    verticalAlign="middle">
<!-- The Application class states property defines the view states. -->
<mx:states>
    <mx:State name="Register">
        <!-- Add a TextInput control to the form. -->
        <mx:AddChild relativeTo="{loginForm}"
            position="lastChild" creatingPolicy="all">
            <mx:FormItem id="confirm" label="Confirm:">
                <mx:TextInput/>
            </mx:FormItem>
        </mx:AddChild>

<!-- Set properties on the Panel container and Button control. -->
        <mx:SetProperty target="{loginPanel}"
            name="title" value="Register"/>
        <mx:SetProperty target="{loginButton}"
            name="label" value="Register"/>

<!-- Remove the existing LinkButton control. -->
        <mx:RemoveChild target="{registerLink}"/>

<!-- Add a new LinkButton control to change
             view state back to the login form. -->
        <mx:AddChild relativeTo="{spacer1}" position="before">
            <mx:LinkButton Label="Return to Login" click="currentState=''"/>
        </mx:AddChild>
    </mx:State>
</mx:states>
```

FIGURE 1A
(PRIOR ART)

```
<mx:Panel title="login" id="loginPanel"
    horizontalScrollPolicy="off" verticalScrollPolicy="off">
    <mx:Form id="loginForm">
        <mx:FormItem label="Username:">
            <mx:TextInput/>
        </mx:FormItem>
        <mx:FormItem label="Password:">
            <mx:TextInput/>
        </mx:FormItem>
    </mx:Form>
    <mx:ControlBar>
        <!-- Use the LinkButton control to change to
            the Register view state. -->
        <mx:LinkButton Label="Need to Register?" id="registerLink"
            click="currentState='Register'"/>
        <mx:Spacer width="100%" id="spacer1"/>
        <mx:Button label="Login" id="loginButton"/>
    </mx:ControlBar>
</mx:Panel>
</mx:Application>
```

FIGURE 1B
(PRIOR ART)

```
<?xml version="1.0"?>
<mx:Application xmlns:mx="http://www.adobe.com/2006/mxml"
    verticalAlign="middle">

<!-- The Application class states property defines the view states. -->
    <mx:states>
        <mx:state name="Login"/>
        <mx:state name="Register"/>
    </mx:states>

<mx:Panel title="Login" title.Register="Register" id="loginPanel"
        horizontalScrollPolicy="off" verticalScrollPolicy="off">
        <mx:Form id="loginForm">
            <mx:FormItem label="Username:">
                <mx:FormInput/>
            </mx:FormItem>
            <mx:FormItem label="Password:">
                <mx:TextInput/>
            </mx:FormItem>
            <mx:FormItem id="confirm" label="Confirm:" includeIn="Register">
                <mx:TextInput/>
            </mx:FormItem>
        </mx:Form>
```

FIGURE 2A

```
<mx:ControlBar>
    <!-- Use the LinkButton control to change to
         the Register view state. -->
    <mx:LinkButton label="Need to Register?" id="registerLink"
        click="currentState='Register'" includeIn="Login"/>
    <mx:LinkButton label="Return to Login: click="currentState='Login'"
        includeIn="Register"/>
    <mx:Spacer width="100%" id="spacer1"/>
    <mx:Button label="Login" label.Register="Register" id="loginButton"/>
</mx:ControlBar>
</mx:Panel>
</mx:Application>
```

FIGURE 2B

```
<Application xmlns="http://ns.adobe.com/mxml/2009" layout="vertical"
verticalAlign="middle" backgroundColor="white">
  <states>
    <State name="Login"/>
    <State name="Register"/>
  </states>                                                              41

<Form id="loginForm">
    <FormHeading label="Login" label.Register="Registration"/>           43
    <FormItem label="Username:">
      <TextInput id="log_username" />                                    44
    </FormItem>
    <FormItem label="E-mail address:" includeIn="Register">
      <TextInput id="email" />                                           45
    </FormItem>
                                                                         42
```

FIGURE 3A

```
            <FormItem label="Password:">
46 {          <TextInput id="log_password" displayAsPassword="true" />
            </FormItem>
            <FormItem label="Confirm password:" includeIn="Register">
47 {          <TextInput id="reg_password2" displayAsPassword="true" />
            </FormItem>
         </FormItem>
48 {       <FormItem>
            <Button label="Login" label.Register="Create Account"/>
           </FormItem>
         </Form>
      </Application>
```

42 { (brace encompassing 46, 47, 48)

```
<Skin xmlns="http://ns.adobe.com/mxml/2009">
    <states>
        <State name="up" />
        <State name="over" stateGroups="overStates" />
        <State name="down" stateGroups="downStates" />
        <State name="disabled" stateGroups="disabledStates" />
        <State name="upAndSelected" />
        <State name="overAndSelected" stateGroups="overStates" />
        <State name="downAndSelected" stateGroups="downStates" />
        <State name="disabledAndSelected" stateGroups="disabledStates" />
    </states>
</content>
    <Group top="1">
        <!-- border -->
        <Rect width='12' height="12">
            <stroke>
                <SolidColorStroke color="0x808080" color.disabledStates="0xC0C0C0"/>
            </stroke>
        </Rect>
        <!-- fill -->
```

FIGURE 5A

```
<Rect left="1" top="1" width="10" height="10">
    <stroke>
        <SolidColorStroke color="0xFFFFFF"
            color.overStates="0xFAFAFA" color.downStates="0xEFEFEF"/>
    </stroke>
    <fill>
        <SolidColor color="0xFFFFFF"
            color.overStates="0xF2F2F2" color.down="0xD8D8D8"
            color.downAndSelected="0xEFEFEF" />
    </fill>
</Rect>
<!-- checkmark -->
<Path data="M 3.5 6.5 1 2 2 1 4 -4"
    includeIn="upAndSelected, overAndSelected,
    downAndSelected, disabledAndSelected">
    <stroke>
        <SolidColorStroke weight="2" caps="square" color="0x747474"
            color.disabledAndSelected="0xB3B3B3" />
    </stroke>
</Path>
</Group>
<!-- Label -->
<TextBox text="{data.label}" left="19" top="3" color.disabled ="0xC0C0C0" />
</content>
</Skin>
```

FIGURE 5B

SYSTEMS AND METHODS FOR CREATING MULTI-STATE CONTENT

RELATED FIELD

This document claims the benefit of U.S. Provisional Application Ser. No. 61/049,874, entitled "Method for Declaratively Authoring a Stateful User Interface" and filed May 2, 2008, the entire contents of which are incorporated by this reference.

FIELD

Embodiments relate generally to the field of computing and specifically to computing applications used to create, control, and otherwise display user interfaces and other rich media content.

BACKGROUND

Various software tools facilitate the creation of user interfaces and other rich media content. For example, developers can use the Adobe® Flex® technologies to create Adobe® Flash® content using an XML-based markup language (i.e., MXML™) to declaratively build and lay out visual components. This declarative code can specify the visual attributes of the content, including the locations and display attributes of the content's visual components. The declarative code may be automatically generated based on a developer having graphically laid out components (e.g., buttons, etc.) on a displayed development canvas.

Adobe® Flex® version 2.0 has a View States feature allowing a developer to express how content or components vary as "state" changes. For a piece of content and/or each of the components within a piece of content, the feature allows a developer to enumerate a list of named states, and for each state, describe a delta of changes relative to a "base" state. FIG. 1 illustrates exemplary declarative code using a change-based syntax that could be used with Adobe® Flex® version 2.0 (prior art). The declarations 1 implement an exemplary Login/Register form by describing exemplary changes to the application's user interface upon changes of state. A "register" state is defined with the register state statements 2 and includes a list of changes to be applied to the base application state when the application changes to the register state. The statements for the login panel 3 specify that when an application user clicks on a "Need to Register" button, an event handler sets the view state to "Register." The register state statements 2 add a TextInput control, change properties of the Panel container and Button control, remove the existing Link-Button control, and add a new LinkButton control.

While the Adobe® Flex® version 2.0 state syntax is expressive, there are various disadvantages to requiring that a developer specify a state in terms of changes to a base state. For example, in order to visualize a given state, a developer has to mentally visualize the base state and mentally implement the coded change instructions to that base state. In addition, because any component required in multiple states generally needs to be in the base state, developers are frequently required to use and keep track of complicated state hierarchy schemes, including multiple layer schemes, e.g., with a first state derived from a second state, the second state derived from a base state, etc.

SUMMARY

Methods and systems for using declarative statements to create multi-state content are disclosed. One exemplary method comprises receiving a portion of code for a multi-state object. The portion of code may comprise a plurality of statements specifying subcomponents and attributes of the multi-state object. The code may identify a state, a subcomponent, and specify, implicitly or explicitly, that the subcomponent is to be included in or excluded from the multi-state object when in a given state. For example, the code may include a statement specifying that a first subcomponent is included in the multi-state object when the multi-state object is in a first state. The plurality of statements may be "inline" within the portion of code, meaning that the statements related to the multi-statement object's components and attributes in various states may all be included within the general portion of code describing the multi-state object (i.e., state information need not be separated out into different portions of the code that specify state differences in terms of changes to another state of the object). The method may further comprise determining that the multi-state object includes the first subcomponent when in the first state based on the statement specifying that the first subcomponent is included in the multi-state object when the multi-state object is in a first state. The method may comprise determining that the multi-state object excludes the first subcomponent when in a second state. The method may provide a piece of content comprising the multi-state object, wherein in the first state, the multi-state object comprises the first subcomponent and, in the second state, the multi-state object does not comprise the first subcomponent.

Another exemplary method comprises receiving a portion of code for a multi-state object, the portion of code comprising a plurality of inline statements specifying any subcomponents and attributes of the multi-state object, a statement of the plurality of inline statements specifying that a first value is used for a first attribute of the multi-state object when the multi-state object is in a first state. The method may further comprise determining that the first attribute of the multi-state object has the first value when the multi-state object is in the first state based on the statement specifying that the first value is used for the first attribute of the multi-state object when the multi-state object is in the first state. The method may further comprise determining that the first attribute of the multi-state object has a second value when the multi-state object is in a second state, the second value different from the first value. The method may further comprise providing a piece of content comprising the multi-state object, wherein in the first state, the multi-state object comprises the first attribute having the first value and, in the second state, the multi-state object comprises the first attribute having the second value.

In other embodiments, a computer-readable medium (such as, for example, random access memory or a computer disk) comprises code for carrying out the methods described herein.

These illustrative embodiments are mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present invention are better understood when the following Detailed Description is read with reference to the accompanying drawings, wherein:

FIG. 1 illustrates exemplary declarative code using a change-based syntax that could be used with Adobe® Flex® version 2.0 (prior art);

FIG. 2 illustrates exemplary declarative statements according to certain embodiments implementing a user interface similar to the user interface implemented by the prior art declarative code of FIG. 1;

FIG. 3 illustrates exemplary declarative statements implementing another exemplary user interface, according to certain embodiments;

FIG. 5 illustrates exemplary declarative statements implementing an exemplary checkbox component, according to certain embodiments;

DETAILED DESCRIPTION OF EXEMPLARY EMBODIMENTS

Figure 4A:
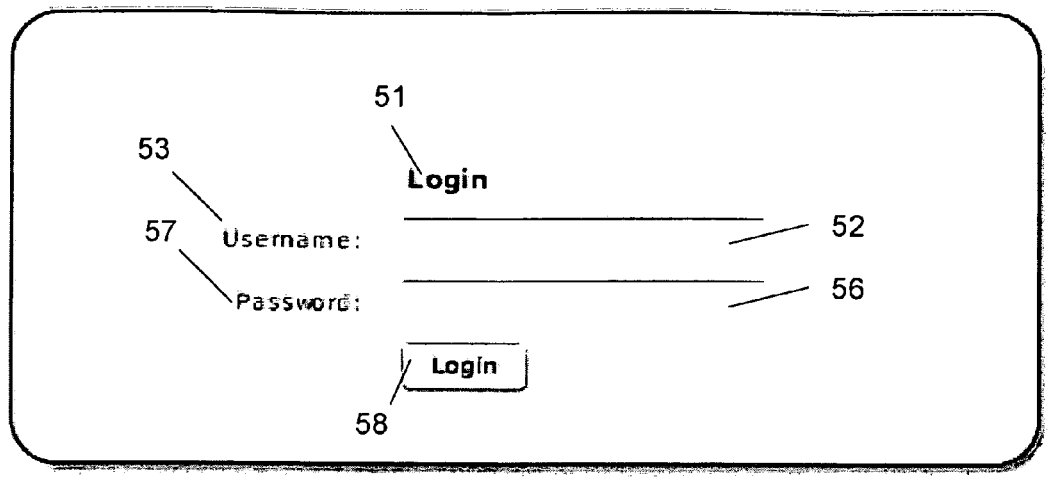
FIGS. 4a and b illustrate different states of the exemplary user interface specified by the exemplary declarative statements of FIG. 3, according to certain embodiments.

Methods and systems for creating multi-state content using state information are disclosed. The state information may specify, for example, that a subcomponent is included in one state and excluded from another state. As another example, the state information may specify that an attribute of the object will have a first value in one state and a different value in another state. Certain embodiments allow a developer to use declarative statements to specify different states for an object. These declarative statements may directly specify the appearance attributes or subcomponents of the object. Certain embodiments allow a developer to specify state-specific appearance attributes and sub-components within the general specification of the object and without having to specify appearance attributes or subcomponents in terms of changes to a base state or any other state.

Illustration of Exemplary Declarative Syntax

The following specific illustrative embodiment is provided to illustrate some of the applications, uses, and benefits of certain of the techniques described herein. Referring now to the drawings in which like numerals indicate like elements throughout the several figures, FIG. 2 illustrates exemplary declarative statements according to certain embodiments implementing a user interface similar to the user interface implemented by the prior art declarative code of FIG. 1.

A states portion 21 of the declarative code 20 identifies that the application will have two states: one named "Login" and one named "Register." A panel portion 22 of the declarative code 20 describes the appearance of the panel of the application, including various components that will be displayed on the panel. A form portion 23 describes a "loginform" component and includes a username form item description 24, a password form item description 25, and a confirm form item description 26. The confirm form item description 26 includes an "includeIn" command 27 specifying that the confirm form item should be included when the application is in the "Register" state:

<mx:FormItem id="confirm" label="Confirm:" includeIn="Register">
<ms: TextInput/>
</mx:FormItem>

The declarative code 20 also comprises a control bar component portion 28 that comprises a "Need to Register" link button portion 29 specifying a link button labeled "Need to Register," and "Return to Login" link button portion 30 specifying a link button labeled "Return to Login." The "Need to Register" link button portion 29 provides the following syntax, specifying that, on a click of the button, the current state is set to the "Register" state and specifying that the "Need to Register" link button is included when the application is in the "Login" state:

<mx:LinkButton label="Need to Register?" id="registerLink" click="currentstate='Register'" includeIn="Login"/>

Conversely, the "Return to Login" link button portion 30 provides the following syntax, specifying that, on a click of that button, the current state is set to the "Login" state and specifying that the "Return to Login" link button is included when the application is in the "Register" state:

<mx:LinkButton label="Return to Login" click="currentstate='Register'" includeIn="Login"/>

The control bar component portion 28 of the declarative code 20 also comprises a button portion 31, providing the following syntax that specifies using [property].[state] or [attribute].[state] notation that the label of the button will be "Login" by default and "Register" when the state is set to the "Register" state:

<mx:Button label="Login" label. Register="Register" id="loginButton"/>

Figure 4B:
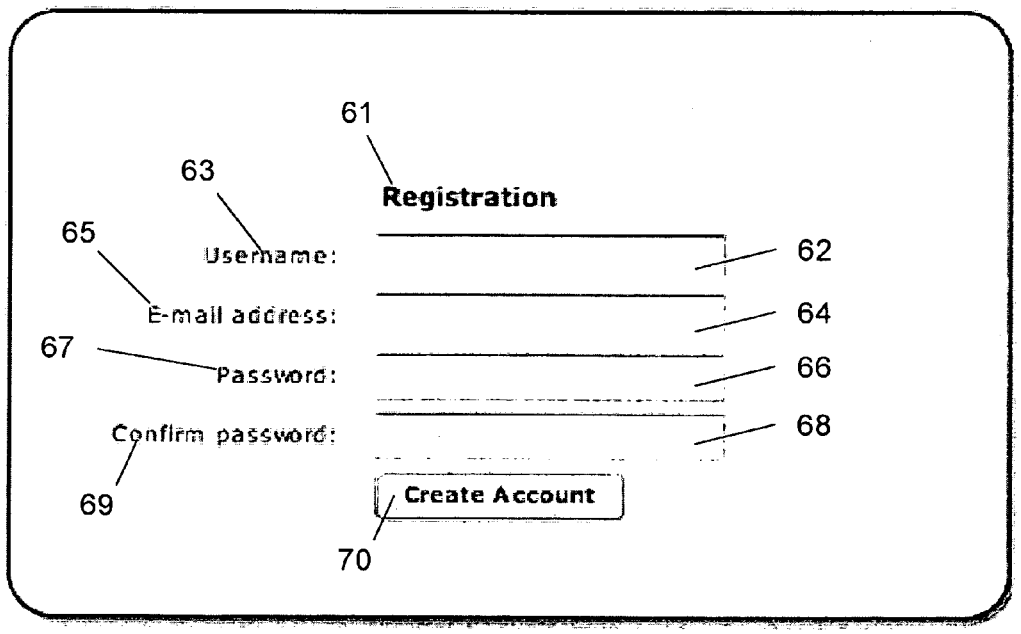

FIG. 3 illustrates exemplary declarative statements implementing another exemplary user interface, according to certain embodiments. FIGS. 4a and b illustrate different states of the exemplary user interface specified by the exemplary declarative statements of FIG. 3, according to certain embodiments. In FIG. 3, a states portion 41 of the declarative code 40 identifies that the application will have two states: one named "Login" and one named "Register." The appearance 50 of the application in the "Login" state is illustrated in FIG. 4A and the appearance 60 of the application in the "Register" state is illustrated in FIG. 4B.

In FIG. 3, a form portion 42 of the declarative code 40 describes the appearance of the application, including various components that will be displayed on the panel according to the state. The form heading portion 43 specifies that the form label default will be "Login" and that, in the "Register" state, the form heading will be "Registration." FIG. 4A illustrates that in the "Login" state, the application form label 51 is "Login." FIG. 4B illustrates that in the "Register" state, the application form label 61 is "Registration."

In FIG. 3, username portion 44 specifies that the form will include a form item with default label of "Username:" and a text input box with id "log_username." FIG. 4A illustrates that in the "Login" state, the application form includes the username textbox 52 and a username text label 53. FIG. 4B illustrates that in the "Register" state, the application form also includes the username textbox 62 and a username text label 63. Thus, both states use the components default attributes and appear the same.

In FIG. 3, e-mail portion 45 specifies that the form will include a form item with default label of "E-mail address:" and a text input box with id "email." The e-mail portion 45 further specifies "includeIn='Register'," specifying that this form item is included in the form when in the "Register" state. FIG. 4A illustrates that in the "Login" state, the application form does not include this form item. FIG. 4B illustrates that, in the "Register" state, the application form does include the specified e-mail textbox 64 and a e-mail address text label 65. In this embodiment, the use of the "includeIn" command specifies an inclusion of the component in the specified state and creates an implied command to exclude the component from all states not expressly using the "includeIn" command. Other embodiments are, of course, possible.

In FIG. 3, password portion 46 specifies that the form will include a form item with default label of "Password:" and a text input box with id "log_password." FIG. 4A illustrates that in the "Login" state, the application form includes the specified password text input box 56 and a password text label 57. FIG. 4B illustrates that, in the "Register" state, the application form also includes the specified password text input box 66 and a password text label 67.

In FIG. 3, confirm password portion 47 specifies that the form will include a form item with default label of "Confirm Password:" and a text input box with id "reg_password2." The confirm password portion 47 further specifies "includeIn='Register'", specifying that this form item is included in the form when in the "Register" state. FIG. 4A illustrates that in the "Login" state, the application form does not include this form item. FIG. 4B illustrates that, in the "Register" state, the application form does include the specified confirm password textbox 68 and a confirm password text label 69.

In FIG. 3, button portion 48 specifies that the form will include a form item button with default label of "Login." The button portion 48 further specifies "label.Register='Create Account'", specifying that this label applies to the button in the "Register" state. FIG. 4A illustrates that in the "Login" state, the application form includes the button 58 labeled with the default "Login." FIG. 4B illustrates that, in the "Register" state, the application form includes the button 70 with the state specific label "Create Account."

Figure 6:
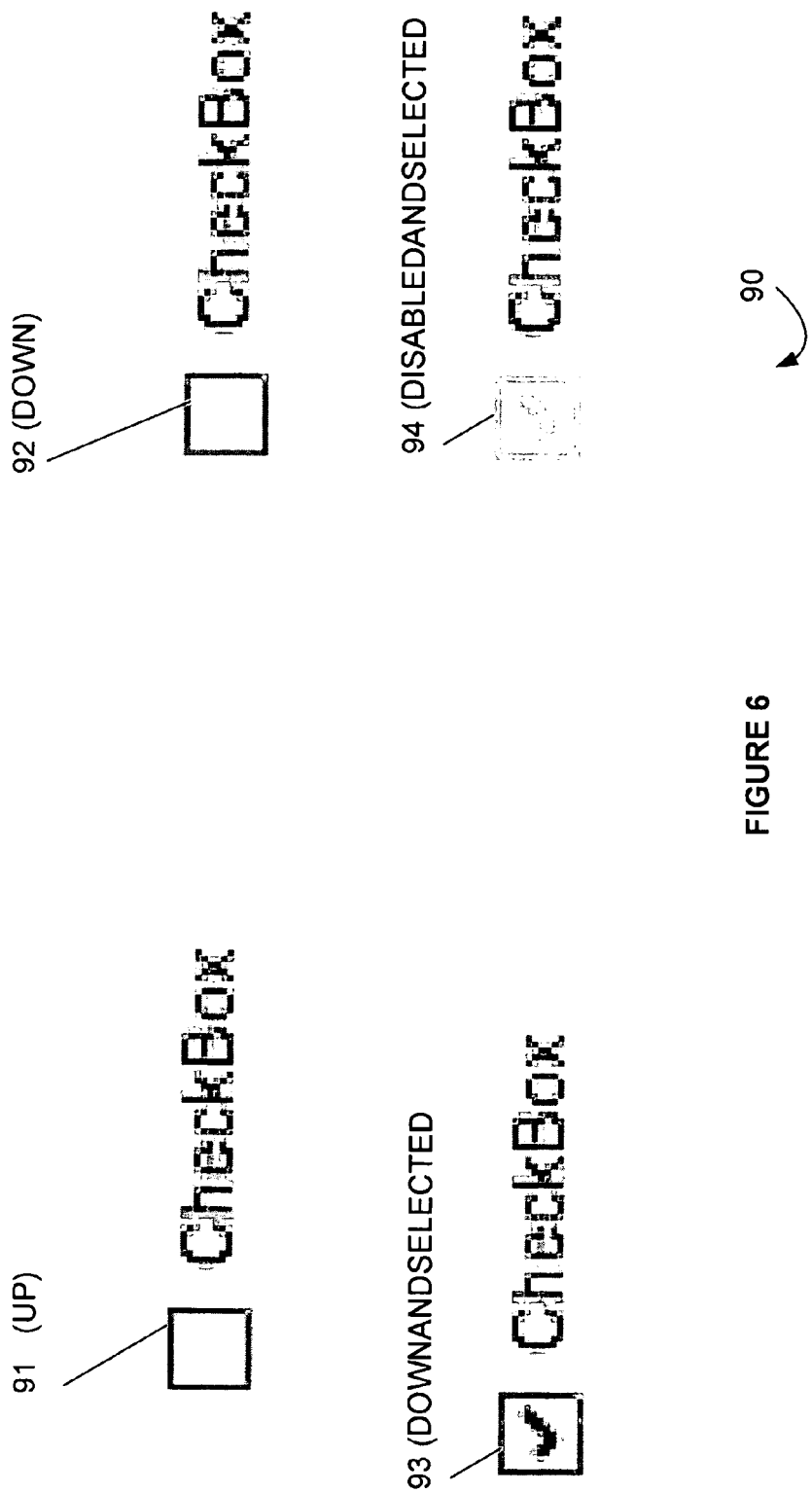
FIG. 6 illustrates different states of the exemplary checkbox component specified by the exemplary declarative statements of FIG. 5, according to certain embodiments.

FIG. 5 illustrates exemplary declarative statements implementing an exemplary checkbox component, according to certain embodiments. FIG. 6 illustrates different states of the exemplary checkbox component specified by the exemplary declarative statements of FIG. 5, according to certain embodiments. In FIG. 5, a states portion 81 of the declarative code 80 identifies that the checkbox will have multiple states: "up," "over," "down," "disabled," "upAndSelected," "overAndSelected," "downAndSelected," and "disabledAndSelected." The states portion 81 further specifies that the "over" state and the "overAndSelected" state are associated with the "overStates" state group, that the "down" state and the "downAndSelected" state are associated with the "downStates" state group, and that the "disabled" state and the "disabledAndSelected" state are associated with the "disabledStates" state group.

The appearance of the checkbox in various states is illustrated in form 90 of FIG. 6, which shows the checkbox in four different states: up 91, down 92, downAndSelected 92, and disabledAndSelected 94. The reasons for these differences of appearance are described below.

In FIG. 5, a content portion 82 of the declarative code 80 includes a border portion 83 that specifies "color.disabledStates='0xC0C0C0'," specifying that the checkbox when in a state that is associated with the disableStates state group (i.e., the "disabled" state and the "disabledAndSelected" state), will have the specified border color. The disabledAndSelected checkbox 94 shown in FIG. 6 has a different, lighter border color (not shown in color) than the other checkboxes 91, 92, 93.

In FIG. 5, the content portion 82 of the declarative code 80 also includes a fill portion 84 that specifies a default SolidColorStroke color of "0xFFFFFF," specifies that color.overStates='0xFAFAFA'," meaning that the checkbox when in a state that is associated with the overStates state group (i.e., the "over" state and the "overAndSelected" state) will have that specified stroke fill color, and specifies "color.downStates='0xEFEFEF'", meaning that the checkbox when in a state that is associated with the downStates state group (i.e., the "down" state and the "downAndSelected" state), will have that specified stroke fill color. The appearance of the fill portions of the down checkbox 92 and the downAndSelected checkbox 94 shown in FIG. 6 illustrate this change by having the specified stroke fill color, i.e., the area within the checkbox border that surrounds the fill.

In FIG. 5, the fill portion 84 of the declarative code 80 further specifies a default SolidColor color of "0xF2F2F2" for the fill, specifying that the checkbox when in a state associated with the overStates state group (i.e., the "over" state and the "overAndSelected" state) will have that specified fill color, also specifying "color.down='0xD8D8D8'" meaning that the fill color for the checkbox when in the "down" state will be the specified color, and also specifying "color.downAndSelected='0xEFEFEF" meaning that the fill color for the checkbox when in the "downAndSelected" state will be that specified color. The appearance of the fill portions of the down checkbox 92 shown in FIG. 6 has color 0xD8D8D8 as its fill color. The appearance of the fill portions of the downAndSelected checkbox 93 shown in FIG. 6 has color 0xEFEFEF as its fill color.

In FIG. 5, the content portion 82 of the declarative code 80 also includes a checkmark portion 85 that specifies "includeIn='upAndSelected, overAndSelected, downAndSelected, disabledAndSelected'." It further specifies the checkmark SolidStrokeColor default of "0x747474" and that "color.disabledAndSelected='0xB3B3B3'" meaning that the stroke color of the checkmark when in the disabledAndSelected state will be the specified color. These features are illustrated in FIG. 6, which shows a checkmark in the downAndSelected checkbox 93 and the disabledAndSelected checkbox 94. The stroke color of the checkmarks also differ as specified. Note that the content portion 82 of the declarative code 80 also specifies that, for the textbox text, "color.disabled='0xC0C0C0'."

These illustrative examples are given to introduce the reader to the general subject matter discussed herein and are not intended to limit the scope of the disclosed concepts. The following sections describe various additional embodiments and examples of methods and systems for monitoring content consumption.

Illustrative Authoring and Runtime Environments

Figure 7:
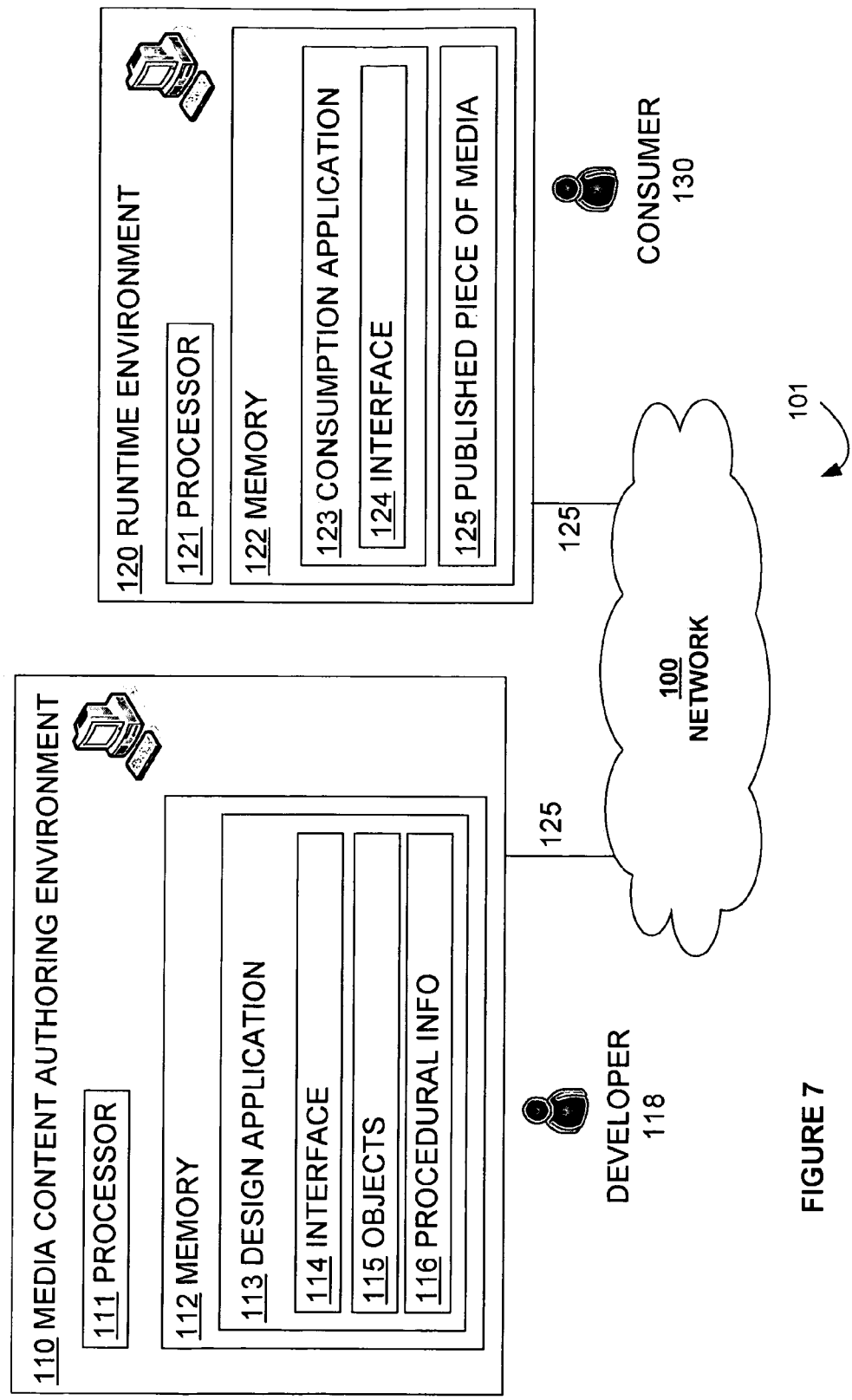
FIG. 7 illustrates an exemplary system environment for developing media content, according to certain embodiments.

FIG. 7 is a system diagram illustrating a media content authoring environment 110 and an exemplary runtime environment 120 according to certain embodiments. Other embodiments may be utilized. The system 101 shown in FIG. 1 comprises a media content authoring environment 110, which may, for example, include a computing device that comprises a processor 111 and a memory 112. A developer 118 uses the media content authoring environment 110 to author media content. The memory 112 may comprise a design application 113 with an interface 114 that the developer 118 uses for such authoring.

The interface 114 may provide a text editor to allow the developer 118 to enter and edit declarative statements defining the appearance of a piece of media content being developed. The interface 114 may further provide a graphical design area or canvas area upon which the developer 118 may place, position, and otherwise define objects that will be a part of a piece of media that is being developed. Information about such objects may be stored in memory 112. The design application 113 may allow the developer 118 to create and use objects, for example, by allowing the developer 118 to position components on a graphical design area and create and revise relationships between components of an object. The graphically positioned objects may be used by the design application 113 to automatically generate declarative code specifying the appearance attributes of the graphical components.

Once the developer is ready to publish a piece of media to a runtime environment, the design application 113 generates a piece of media 125. For example, declarative statements defining the appearance of the piece of media may be used to generate a published piece of media 125. The piece of media 25 may be used by another application on the developer's computing device or sent to another location, for example, through a network 100 to a runtime environment 120. The runtime environment may also include a processor 121 and a memory 122. The memory 122 will generally include a consumption application 123 that provides an interface 124 for viewing or otherwise consuming pieces of media. The piece of media 125 may be stored in memory 122 and viewed or otherwise consumed by a consumer 130 using the interface 124 of the consumption application 123.

Illustrative Methods of Authoring Multi-State Objects Having State-Dependent Subcomponents The appearance of a piece of multi-state media content in a given state (e.g., a login state) may differ from the appearance of the piece of content in other states and yet share common components or other appearance features with one or more of the other states. Similarly, the appearance of a given component (e.g., a button) in a given state (e.g., a pressed state) may differ from the component in other states with respect to its attributes and its own subcomponents while also sharing certain appearance attributes (e.g., background color) and/or subcomponents with one or more other states of the component.

The term "multi-state objects" is used herein to refer to both multi-state pieces of content and multi-state components of content. Certain embodiments facilitate, among other things, a developer's ability to create these multi-state objects with an interface that allows subcomponents of any object to be included in or excluded from any state of the object. For example, a submit button subcomponent may be included in the a login state of a piece of content and a purchase state of the media, but excluded from a browse state of the piece of content. A developer is able to develop a state with the knowledge that any component that has been used so far is available to effectively turn on or off in any new state being developed. A subcomponent can be included in a new state and then modified for that new state.

The interface may allow the inclusion of and/or exclusion of a subcomponent to be specified in a simple declarative statement that identifies a particular state or group of states and whether the subcomponent will be included in or excluded from the object when in that particular state or group of states. The interface may include a graphic tool that can display each of the different states of an object and allow any subcomponent that is used in any state to be included in any other state. Declarative code may be automatically generated from such a graphical tool based on the graphical specifications of subcomponent inclusions and exclusions.

Certain embodiments also provide a simple way to move a subcomponent from within one object state to within another object state or from within one object to within another object (i.e. re-parenting). For example, graphically moving a subcomponent from within the display of an object in a first state to the display of an object in another state could automatically generate a command (e.g., supporting declarative code) that the subcomponent will be included in the second state.

Figure 8:
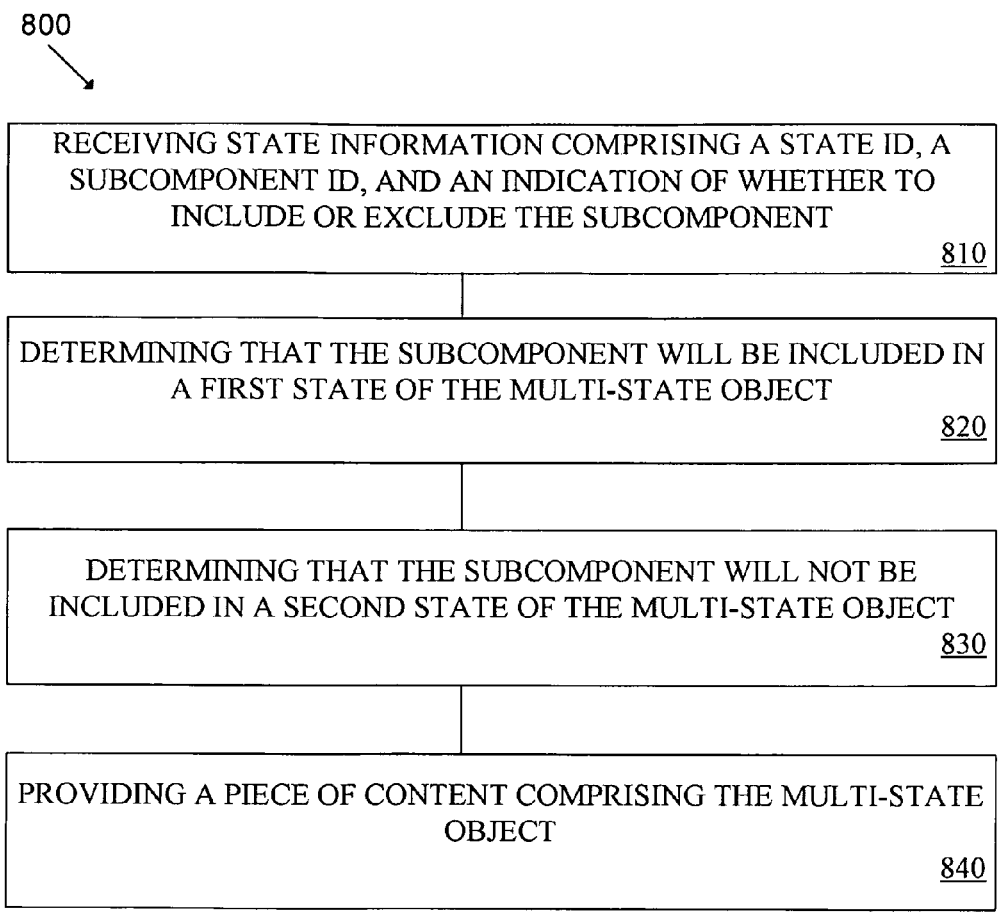
FIG. 8 is a flow chart illustrating a method of declaratively authoring content having multiple states, according to certain embodiments.

FIG. 8 is a flow chart illustrating a method 800 of creating multi-state objects, according to certain embodiments. For purposes of illustration only, the elements of this method are described with reference to the system depicted in FIG. 7. A variety of other implementations are also possible. The method 800 may be computer implemented.

The method 800 comprises receiving state information, the state information comprising an identification of a state of one or more states of a multi-state object, an identification of a subcomponent, and specifying that the subcomponent is to be included in or excluded from the multi-state object when the multi-state object is in the state, as shown in block 810. Such state information may be received, for example, from a developer 118 using an interface 114 on a design application 113 shown in FIG. 7. The state information may be received, for example, by a compiler of the design application 113 when the developer 118 creates a piece of content.

The state information that is received may be a part of declarative statements specifying the appearance of the content and/or graphical representations of the intended appearance of the content. For example, a declarative statement may provide an include-in statement or an exclude-from statement comprising an identification of the first state, an identification of the subcomponent, and specifying that the subcomponent is to be included in or excluded from the multi-state object when the multi-state object is in the first state. The identification of the first state in such a statement may directly identify the state or comprise an identification of a state group, for example, a state group comprising the first state and a third state. The state group may have been specified by a declarative statement specifying, for example, that the state group comprises the first state and the third state.

The state information that is received may be a part of or derived from graphical representations of the intended appearance of the content. For example, the state information may be received from a graphical development engine interpreting the use of the subcomponent in one or more graphical representations of the multi-state object. Interpreting the use of the subcomponent in one or more graphical representations of the multi-state object may comprise, for example, recognizing whether the subcomponent is used in the state of the multi-state object and creating a declarative statement identifying the subcomponent, the state, and whether the subcomponent is used in the state. These declarative statements can provide the state information used to create the piece of content.

The method 800 further comprises determining that the subcomponent will be included in a first state of the one or more states of the multi-state object based on the state information, as shown in block 820. Similarly, the method 800 further comprises determining that the subcomponent will not be included in a second state of the one or more states of the multi-state object based on the state information, as shown in block 830. The second state is different from the first state.

The method 800 further comprises providing a piece of content comprising the multi-state object, as shown in block 840. In the first state, the multi-state object comprises the subcomponent. In the second state, the multi-state object does not comprise the subcomponent. The piece of media content may be generated, for example, by a design application such as the design application 113 shown in FIG. 7 that compiles information about a piece of content being developed such as declarative statements specifying the appearance of the content and/or graphical representations of the intended appearance of the content. The information used by the design application 113 can include the state information specifying the appearance of the multi-state object in different states. Providing the piece of content may comprises compiling a portion of the code as compiled output, storing the compiled output, and/or sending the compiled output to a recipient.

Illustrative Methods of Authoring Multi-State Objects Having State-Dependent Attributes The creation of multi-state objects may also be facilitated with an interface that allows straightforward manipulation of an object's attributes for a given state. Exemplary object attributes include general properties (e.g., the label of a button), style properties (e.g., a background color), and event handler properties (e.g., defining what happens when a button is clicked while the button is in a given state), among other things. In certain embodiments, an interface may allow an object attribute to be specified in a graphical manner. For example, a developer may use a visual interface to create a first state of a piece of content by drawing a button and a title on a canvas. The developer can create a second state and change the title for that second state using a states interface that displays and accepts changes to how the title appears in different states. For example, the interface may include a states panel that allows a developer to see and/or change attributes for an object in a given state. The object attributes specified in a visual interface may, of course, be converted to supporting declarative code.

In certain embodiments, an interface allows an object attribute to be specified directly in a piece of declarative code. A dot notation, for example, may be used to change the attributes of a particular object. A specific example of an exemplary dot notation is <attribute>.<state>="<value>", in which <attribute> identifies the attribute to be changed, <state> identifies in which state or state group the specified attribute value will apply, and <value> identifies the specified value of the attribute that will apply in the specified state or state group. Using this exemplary format the declarative statement label.Register="PLEASE COMPLETE THE FOLLOWING TO REGISTER YOUR ACCOUNT" could be used to specify that the label attribute of an object is PLEASE COMPLETE THE FOLLOWING TO REGISTER YOUR ACCOUNT when the object is in the Register state.

Figure 9:
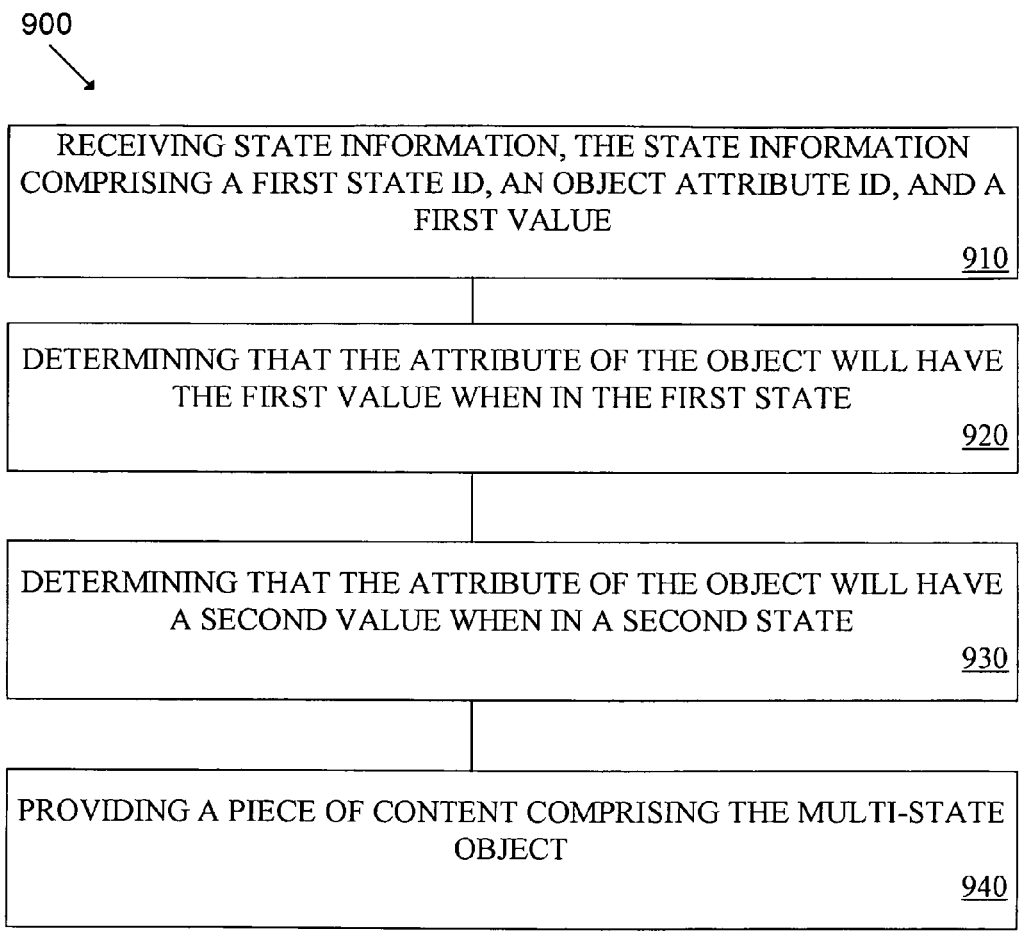
FIG. 9 is a flow chart illustrating another method of declaratively authoring content having multiple states, according to certain embodiments.

FIG. 9 is a flow chart illustrating another method of creating multi-state objects, according to certain embodiments. For purposes of illustration only, the elements of this method are described with reference to the system depicted in FIG. 7. A variety of other implementations are also possible.

The method 900 comprises receiving state information, the state information comprising an identification of a first state of one or more states of a multi-state object, an identification of an attribute of the multi-state object, an identification of a first value, as shown in block 810. The state information may specify that the first value is to be used for the attribute of the multi-state object when the multi-state object is in the first state. The state information may be received, for example, from a developer 118 using an interface 114 on a design application 113 shown in FIG. 7. The state information may be received, for example, by a compiler of the design application 113 when the developer 118 creates a piece of content.

The state information that is received may be a part of declarative statements specifying the appearance of the content and/or graphical representations of the intended appearance of the content. For example, a declarative statement may provide a statement that the value of an attribute is given a specified value when the object is in a specified state. This may be expressed, for example, in dot notation or otherwise. The identification of the state may directly identify the state or comprise an identification of a state group, for example, a state group comprising the first state and a third state. The state group may have been specified by a declarative statement specifying, for example, that the state group comprises the first state and the third state.

The state information that is received may be a part of or derived from graphical representations of the intended appearance of the content. For example, the state information may be received from a graphical development engine interpreting the values of a multi-state object's attributes in one or more graphical representations of the multi-state object in various states. This interpretation may comprise, for example, recognizing whether the multi-state attribute has one value when in one state of the multi-state object and another value when it is in another state. One or more declarative statements may be generated identifying the attribute values in these various states and can be used to provide the state information used to create the piece of content.

The method 900 further comprises determining that the attribute of the multi-state object will have the first value when the multi-state object is in the first state of the one or more states, as shown in block 920. Similarly, the method 900 further comprises determining that the attribute of the multi-state object will have a second value when the multi-state object is in a second state of the one or more states, as shown in block 930. The second value can be different from the first value.

The method 900 further comprises providing a piece of content comprising the multi-state object, as shown in block 940. In the first state, the multi-state object comprises the attribute having the first value and, in the second state, the multi-state object comprises the attribute having the second value. The piece of media content may be generated, for example, by a design application such as the design application 113 shown in FIG. 7 that compiles information about a piece of content being developed, such as declarative statements specifying the appearance of the content and/or graphical representations of the intended appearance of the content. The information used by the design application 113 can include the state information specifying the appearance of the multi-state object in different states.

Illustrative Methods Using State Groups

An object may have many states that share a significant amount of presentation components and attributes. State groups can be used to avoid the cumbersome and potentially confusing requirement of having to specify an attribute for each of many states. A state group's feature can allow a developer to group a set of states and give that group a name. This name can be used in the same manner as the name of an individual state. In one embodiment, states and state groups can be specified together in a states declaration portion of a declarative document. An exemplary use of state groups involves a piece of content that uses a button in states A, B, and G but not states C, D, and F. A state group can be defined that includes state A, B, and G and then a single declarative statement can specify that the button should be included in that state group.

General

While the described embodiments relate to developing rich media content using inline declarative statements, these are merely illustrative. The techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 7 as functional or storage components on the respective devices. As is known to one of skill in the art, such applications may be resident in any suitable computer-readable medium and execute on any suitable processor. For example, the devices at environments 110, 120 each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the network 100 shown in FIG. 7 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs.

What is claimed is:

1. A computer implemented method comprising:
receiving a portion of code for a multi-state object, the portion of code comprising a plurality of statements specifying any subcomponents and attributes of the multi-state object, a statement of the plurality of statements specifying that a first subcomponent is included in the multi-state object when the multi-state object is in a first state;
determining that the multi-state object includes the first subcomponent when in the first state based on the statement specifying that the first subcomponent is included in the multi-state object when the multi-state object is in a first state;
determining that the multi-state object excludes the first subcomponent when in a second state; and
providing a piece of content comprising the multi-state object, wherein in the first state, the multi-state object comprises the first subcomponent and, in the second state, the multi-state object does not comprise the first subcomponent.

2. The method of claim 1, wherein the statement of the plurality of statements comprises a declarative statement.

3. The method of claim 2, wherein the statement of the plurality of statements is an include-in statement comprising an identification of the first state, an identification of the first subcomponent, and specifying that the first subcomponent is to be included in the multi-state object when the multi-state object is in the first state.

4. The method of claim 3, wherein the identification of the first state comprises an identification of a state group, the state group comprising the first state and a third state.

5. The method of claim 4, further comprising receiving one or more declarative statements specifying that the state group comprises the first state and the third state.

6. The method of claim 1, wherein the plurality of statements further comprise an exclude-from statement comprising an identification of the second state, an identification of the first subcomponent, and specifying that the first subcomponent is to be excluded from the multi-state object when the multi-state object is in the second state.

7. The method of claim 6, wherein the identification of the second state comprises an identification of a state group, the state group comprising the second state and a third state.

8. The method of claim 7, further comprising receiving one or more declarative statements specifying that the state group comprises the second state and the third state.

9. The method of claim 1, wherein the multi-state object is an entire piece of content.

10. The method of claim 1, wherein the multi-state object is a component of a piece of content.

11. The method of claim 1, wherein the portion of code for the multi-state object is received from a graphical development engine interpreting the use of the first subcomponent in one or more graphical representations of the multi-state object.

12. The method of claim 11, wherein interpreting the use of the first subcomponent in one or more graphical representations of the multi-state object comprises:

recognizing whether the first subcomponent is used in the first state of the multi-state object; and creating a declarative statement identifying the first subcomponent, the first state, and that the first subcomponent is used in the first state; and wherein the declarative statement provides the state information.

13. The method of claim 1, wherein providing the piece of content comprises compiling the portion of the code as compiled output and storing the compiled output.

14. A computer implemented method comprising:

receiving a portion of code for a multi-state object, the portion of code comprising a plurality of statements specifying any subcomponents and attributes of the multi-state object, a statement of the plurality of statements specifying that a first value is used for a first attribute of the multi-state object when the multi-state object is in a first state;

determining that the first attribute of the multi-state object has the first value when the multi-state object is in the first state based on the statement specifying that the first value is used for the first attribute of the multi-state object when the multi-state object is in the first state;

determining that the first attribute of the multi-state object has a second value when the multi-state object is in a second state, the second value different from the first value; and providing a piece of content comprising the multi-state object, wherein in the first state, the multi-state object comprises the first attribute having the first value and, in the second state, the multi-state object comprises the first attribute having the second value.

15. The method of claim 14, wherein the statement of the plurality of statements comprises a declarative statement.

16. The method of claim 14, wherein the declarative statement comprises a dot notation comprising an identification of the first state and an identification of the first attribute.

17. The method of claim 16, wherein the identification of the first state comprises an identification of a state group, the state group comprising the first state and a third state.

18. The method of claim 17, further comprising receiving one or more declarative statements specifying that the state group comprises the first state and the third state.

19. The method of claim 14, wherein the multi-state object is an entire piece of content.

20. The method of claim 14, wherein the multi-state object is a component of a piece of content.

21. The method of claim 14, wherein the portion of code for the multi-state object is received from a graphical development engine interpreting the use of the first attribute in one or more graphical representations of the multi-state object.

22. The method of claim 21, wherein interpreting the use of the first attribute in one or more graphical representations of the multi-state object comprises:

recognizing the first value of the first attribute of the multi-state object as used in a state of the graphical representation of the state of the multi-state object; and creating a declarative statement identifying the first attribute, the first state, and the first value; and wherein the declarative statement provides the state information.

23. The method of claim 14, wherein the second value is a default value.

24. A system comprising:

a processor executing instructions stored on a non-transitory computer readable storage medium to provide an interpretation engine to provide steps comprising:

receiving a portion of code for a multi-state object, the portion of code comprising a plurality of statements specifying any subcomponents and attributes of the multi-state object, a statement of the plurality of statements specifying that a first subcomponent is included in the multi-state object when the multi-state object is in a first state;

determining that the multi-state object includes the first subcomponent when in the first state based on the statement specifying that the first subcomponent is included in the multi-state object when the multi-state object is in a first state; and determining that the multi-state object excludes the first subcomponent when in a second state; and a content generating engine for providing a piece of content comprising the multi-state object, wherein in the first state, the multi-state object comprises the first subcomponent and, in the second state, the multi-state object does not comprise the first subcomponent.

25. A non-transitory computer-readable storage medium on which is encoded program code, the program code comprising:

program code for receiving a portion of code for a multi-state object, the portion of code comprising a plurality of statements specifying any subcomponents and attributes of the multi-state object, a statement of the plurality of statements specifying that a first subcomponent is included in the multi-state object when the multi-state object is in a first state;

program code for determining that the multi-state object includes the first subcomponent when in the first state based on the statement specifying that the first subcomponent is included in the multi-state object when the multi-state object is in a first state;

program code for determining that the multi-state object excludes the first subcomponent when in a second state; and program code for providing a piece of content comprising the multi-state object, wherein in the first state, the multi-state object comprises the first subcomponent and, in the second state, the multi-state object does not comprise the first subcomponent.

26. A non-transitory computer-readable storage medium on which is encoded program code, the program code comprising:

program code for receiving a portion of code for a multi-state object, the portion of code comprising a plurality of statements specifying any subcomponents and attributes of the multi-state object, a statement of the plurality of statements specifying that a first value is used for a first attribute of the multi-state object when the multi-state object is in a first state;

program code for determining that the first attribute of the multi-state object has the first value when the multi-state object is in the first state based on the statement specifying that the first value is used for the first attribute of the multi-state object when the multi-state object is in the first state;

program code for determining that the first attribute of the multi-state object has a second value when the multi-state object is in a second state, the second value different from the first value; and program code for providing a piece of content comprising the multi-state object, wherein in the first state, the multi-state object comprises the first attribute having the first value and, in the second state, the multi-state object comprises the first attribute having the second value.

27. The computer implemented method of claim 1, wherein the statement specifying that the first subcomponent is included in the multi-state object when the multi-state object is in the first state is inline with respect to another statement specifying that the multi-state object excludes the second component when the multi-state object is in the second state.

28. The method of claim 2, wherein the declarative statement identifies a state group and a subcomponent that is associated with the state group, wherein the state group includes one or more states.

29. The method of claim 28, wherein a particular subcomponent included in the first state is enabled to be included in one or more other states.

30. The method of claim 1, wherein state differences are not specified in terms of changes to any other state of the object.

\* \* \* \* \*